June 23, 1931.   R. A. L. VOLET   1,811,679
BALL AND ROLLER BEARING
Filed July 10, 1929
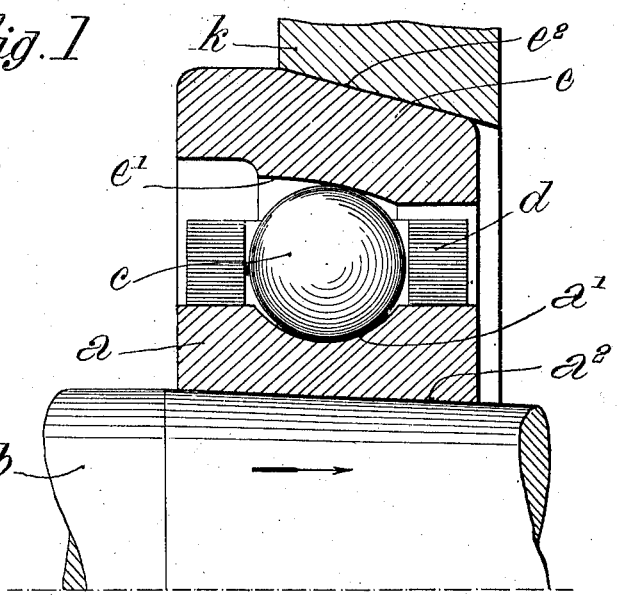
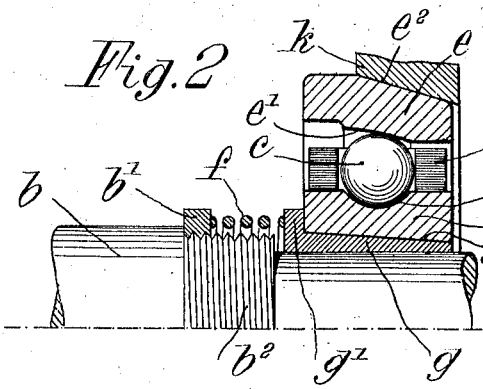
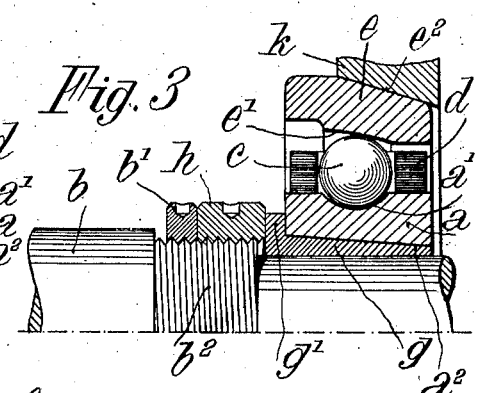
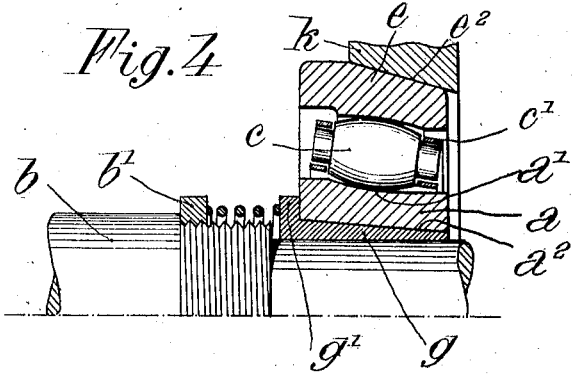
René Alfred Laurent Volet
Inventor
by Louis Barnett
Attorney Patented June 23, 1931

1,811,679

UNITED STATES PATENT OFFICE

RENÉ ALFRED LAURENT VOLET, OF LA VARENNE ST. HILAIRE, FRANCE

BALL AND ROLLER BEARING

Application filed July 10, 1929, Serial No. 377,178, and in Belgium August 13, 1928.

The present invention relates to ball and roller bearing assemblies.

One of the objects of the invention is to provide a form of ball or roller bearing assembly designed to better resist the combined effects of radial and end-thrust pressures.

Another object is to provide means operative to correct inequalities in the wear of the balls or rollers.

Still another object is to provide means for correcting play of the roller or ball bearing assembly in its supports due to wear, and longitudinal displacement of a shaft mounted thereon.

Further objects will appear in the course of the detailed description now to be given with reference to the accompanying drawings in which:—

Fig. 1 shows, in section, one illustrative embodiment of the invention;

Fig. 2 represents an assembly of the type shown in Fig. 1 fitted with a device for correcting for play;

Fig. 3 illustrates a variant of the assembly represented in Fig. 2;

Fig. 4 shows the invention applied to a roller bearing.

Referring to Fig. 1 of the drawings there is shown a ring $a$ having a surface of revolution $a^1$ formed exteriorly thereof and a conical surface $a^2$ on the interior adapted to coact with a shaft $b$,—a plurality of balls $c$,— a cage $d$ of usual design having circular openings therein adapted to receive balls $c$,—and an exterior ring $e$ having a surface of revolution $e^1$ formed interiorly thereof and an exterior conical surface $e^2$ adapted to coact with a corresponding shaped frame or journal member $k$. It is to be noted that while the center of curvature of the arc of revolution determining surface $a^1$ lies in a plane perpendicular to the axis of shaft $b$ passing through the center of balls $c$, this is not true for the center of curvature of the corresponding arc determining surface $e^1$ which is situated to one side—to the left in the example shown, because of an assumed end thrust from left to right on shaft $b$—of such a plane. The conical surfaces on the interior of ring $a$ and on the exterior of ring $e$ serve to lock the ball-bearing assembly rigidly in position.

In ball bearings of the hereinabove described type it will be noted that when balls $c$ are forced outward under the action of centrifugal force they move in the direction of the arrow (Fig. 1) and become wedged between the converging left hand portions of surfaces $a^1$ and $c^1$. If certain of the balls wear more rapidly than others and are of reduced diameter, they will move further to the left than the larger balls. The device, therefore, operates to maintain all of the balls in contact with bearing surfaces $a^1$ and $e^1$ and assures even distribution of the load. The effect of end thrust exerted from left to right on the shaft is to wedge the balls between the left hand side of surface $a^1$ and some portion of surface $e^1$. It will be noted that one essential condition as to the relative form of surfaces $a^1$ and $e^1$ is that their left hand portions i. e. the portions on the side of the thrust, converge.

The structures shown in Figs. 2 and 3 are designed to prevent longitudinal displacement of shaft $b$ due to wear of balls $c$. In the form of assembly illustrated in Fig. 2, this result is obtained by mounting assembly $a, c, d, e$ shown in Fig. 1 on a sleeve $g$ having an external conical surface coacting with surface $a^2$ and an internal cylindrical surface fitting slidingly over shaft $b$, and intercalating a spring $f$ between a flange $g^1$ formed on sleeve $g$ and a nut $b^1$ threadedly engaging on shaft $b$. In the structure represented in Fig. 3, spring $f$ is replaced by an internally threaded collar $h$ engaging with threads $b^2$ of shaft $b$. Whatever be the form of construction adopted, it is obvious that spring $f$ and collar $h$ will operate, when properly adjusted, to correct the effect of wear on balls $c$, and prevent longitudinal displacement of shaft $b$.

In the modification illustrated in Fig. 4, balls $c$ are replaced by barrel-shaped rollers $c^1$, having their axes positioned parallel to axis $b$, which engage in properly formed grooves, i. e. of elliptical, circular or a similar conic section, in rings $a$ and $e$, groove $e^1$ being inclined to groove $a^1$ and contacting tangentially with rollers $c^1$. Obviously, this form of the invention may be fitted with either a spring $f$ or an annular sleeve $h$ of the type shown in Figs. 1 and 3 for preventing longitudinal displacement of shaft $b$.

From the foregoing, it will be obvious that a ball or roller-bearing assembly subjected to the combined effect of radial and end-thrust pressure and designed in accordance with the invention will operate to maintain the load evenly distributed and counteract any tendency towards longitudinal displacement of a shaft supported thereby.

What I claim is:—

1. In combination,—a shaft,—a sleeve slidably mounted on said shaft, said sleeve having an external conical surface,—means tending to force said sleeve along said shaft,—a ring having an internal conical surface coacting with the external conical surface of said sleeve,—a plurality of rotatable elements mounted to roll in contact with the external surface of said ring,—an annular body having an internal surface positioned to contact with said rotatable elements, said internal surface of the annular body converging towards the external surface of the ring, said annular body having an external conical surface,—and a journal member having an internal conical surface coacting with the external conical surface of said annular body.

2. In combination,—a shaft,—a sleeve slidably mounted on said shaft, said sleeve having an external conical surface,—a nut threadedly engaging with said shaft,—a spring interposed between said nut and said sleeve and exerting an end-thrust on the latter,—a ring having an internal conical surface coacting with external conical surface of said sleeve,—a plurality of rotatable elements mounted to roll in contact with the external surface of said ring,—an annular body having an internal surface positioned to contact with said rotatable elements, said internal surface of the annular body converging towards the external surface of the ring, said annular body having an external conical surface,—and a journal member having an internal conical surface coacting with the external conical surface of said annular body.

3. In combination, a shaft, a sleeve slidably mounted on said shaft, said sleeve having an external conical surface, means tending to force said sleeve along said shaft, a ring having an internal conical surface coacting with the external conical surface of said sleeve, a plurality of rotatable elements mounted to roll in contact with the external surface of said ring, an annular body having an internal surface positioned to contact with said rotatable elements, said internal surface of the annular body being spherical surface of revolution, said annular body having an external conical surface, and a journal member having an internal conical surface coacting with the external conical surface of said annular body.

In testimony whereof I have signed this specification.

RENÉ ALFRED LAURENT VOLET.